US006216217B1

(12) United States Patent
Seki

(10) Patent No.: US 6,216,217 B1
(45) Date of Patent: Apr. 10, 2001

(54) DATA PROCESSOR

(75) Inventor: Shuichi Seki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/117,367

(22) PCT Filed: Feb. 27, 1997

(86) PCT No.: PCT/JP97/00591

§ 371 Date: Jul. 28, 1998

§ 102(e) Date: Jul. 28, 1998

(87) PCT Pub. No.: WO98/38571

PCT Pub. Date: Sep. 3, 1998

(51) Int. Cl.$^7$ .................................................. G06F 11/34
(52) U.S. Cl. ................................ 712/33; 712/1; 712/36; 712/37; 712/38
(58) Field of Search ................................ 712/1, 33, 37, 712/36, 38

(56) References Cited

U.S. PATENT DOCUMENTS

| | | | |
|---|---|---|---|
| 4,037,204 | * | 7/1977 | Bennett et al. ........................ 710/262 |
| 4,409,653 | * | 10/1983 | Bruce, Jr. .............................. 710/262 |
| 5,175,864 | * | 12/1992 | Tairaku et al. ............................ 712/1 |
| 5,325,521 | * | 6/1994 | Koyama et al. ......................... 714/55 |
| 5,339,436 | * | 8/1994 | Tairaku et al. ........................ 395/775 |
| 5,498,981 | * | 3/1996 | Fukushige .............................. 326/93 |
| 5,577,214 | * | 11/1996 | Baji ..................................... 710/107 |
| 5,581,745 | * | 12/1996 | Muraoka et al. ..................... 713/502 |
| 5,740,404 | * | 4/1998 | Baji ..................................... 711/167 |
| 5,761,533 | * | 6/1998 | Aldereguia et al. ................... 710/25 |
| 5,898,815 | * | 4/1999 | Bluhm et al. .......................... 710/45 |

FOREIGN PATENT DOCUMENTS 62-217350   9/1987   (JP).
   399354   4/1991   (JP).

* cited by examiner

Primary Examiner—Daniel H. Pan
Assistant Examiner—Dzung C. Nguyen
(74) Attorney, Agent, or Firm—Rothwell, Figg, Ernst & Manbeck

(57) ABSTRACT

A data processor including: a CPU (1) for performing a wait operation upon input of a wait signal (10) to its wait terminal (9); a wait/wait cancel instruction setting register (11) to which the CPU (1) sets a wait instruction and a wait cancel instruction; and a wait controller (12) for outputting a wait signal to the wait terminal (9) of the CPU (1) in accordance with the setting of the register (11), wherein the inventive data processor allows a wait state to be set and canceled as programmed independently of address space constraints.

5 Claims, 4 Drawing Sheets

DATA PROCESSOR

TECHNICAL FIELD

The present invention relates to a data processor having a central processing unit (called the CPU hereunder) and such accessible devices as a memory and I/O devices that may be accessed by the CPU, and more particularly to the control of wait operations when the CPU gains access to a device to be accessed at a low speed.

BACKGROUND ART

There is conventionally known data processors that perform access operations involving a wait state on accessible devices running at low speed. This type of data processor causes the CPU to wait temporarily upon access to a low-speed accessible device by feeding a chip select signal back to a wait terminal of the CPU.

FIG. 1 is a view showing a constitution of such a conventional data processor. In FIG. 1, reference numeral 1 stands for a CPU providing overall control of the data processor; 2 for an address decoder for decoding addresses output by the CPU 1; 3 for an I/O device at a low-speed (called the low-speed device hereunder) among configured I/O devices as accessible devices assigning a predetermined address; and 4 for an address/data bus linking the CPU 1, the address decoder 2 and the low-speed device 3. Reference numeral 5 for a chip select signal output from the address decoder 2; 6 for a read signal output from the CPU 1; and 7 for a write signal also output by the same. Reference numeral 8 for a chip select terminal of the low-speed device 3; and 9 for a wait terminal of the CPU 1.

Next, operations will be described.

When the CPU 1 is to read data from the low-speed device 3, the CPU 1 first places onto the address/data bus 4 a target intra-device address from which to read the data. The address from the CPU 1 is sent to the address decoder 2, and the address decoder 2 decodes the received address and outputs accordingly a chip select signal 5 to select the predetermined accessible device. This chip select signal 5 is input to the chip select terminal 8, whereby the low-speed device 3 is selected.

The low-speed device 3 selected by the chip select signal 5 outputs data onto the address/data bus 4 when the read signal 6 is received from the CPU 1. At this point, however, since the chip select signal 5 is being fed back to the wait terminal 9 of the CPU 1, the CPU 1 performs a wait operation. After this wait operation, the data placed by the low-speed device 3 onto the address/data bus 4 are read into the CPU 1 in accordance with the read signal 6.

Then, when the CPU 1 is to write data to the low-speed device 3, the CPU 1 first outputs onto the address/data bus 4 a target intra-device address to which to write the data, as in the case of reading data. The address decoder 2 decodes the received address and outputs accordingly a chip select signal 5, and the chip select signal 5 is input to the chip select terminal 8 of the low-speed device 3, whereby the device 3 is selected.

After placing the address onto the address/data bus 4, the CPU 1 outputs a write signal 7 causing the data to be output onto the bus 4. At this point, however, since the chip select signal 5 is being fed back to the wait terminal 9 of the CPU 1, the CPU 1 performs the wait operation. After this wait operation, the data placed onto the address/data bus 4 are written to the low-speed device 3 in accordance with the write signal 7 from the CPU 1.

Since the conventional data processor has the above constitution, the addresses to be accessed through wait operations are fixed by the address decoder 2. To change such addresses requires performing troublesome circuit modifications involving the replacement of the address decoder 2, thus there is a problem.

In addition, there is a problem that when the wait access depends on the address, so that if the low-speed device 3 having different read and write access speeds, i.e., a high-speed for read access and a low-speed for write access, is used, the CPU 1 must wait for a redundant time if it is met to the write access speed, and on the other hand, the data cannot be written if it is met to the read access speed.

Furthermore, in recent years, although system control programs are written in a flash memory in microcomputer-applied systems, some of these systems may have their programs written to an expensive flash memory at their prototype trial stage and later to an inexpensive one-time ROM (read-only memory) at the commercial stage. In such cases, for the above-described reasons, there is a problem that the read access speed may become lower than desired (i.e., the operating speed of the entire system is reduced unacceptably), or it may become impossible to write data to the flash memory.

Techniques related to the above-described type of conventional data processor are disclosed illustratively in JP-A No. Sho 62-217350, as well as in JP-A No. Hei 3-99354.

The apparatus discussed in the above-cited JP-A No. Sho 62-217350 involves a CPU equipped with storage means for storing, in a concentrated manner, a response speed corresponding to each of the I/O devices configured. Every time any one of the I/O devices is selected, the corresponding information held in the storage means is read out as the reference speed for performing a wait operation. In that case, since the wait operation is carried out at the time of the selection of an I/O device, there is a problem that it is impossible for any program to freely set or cancel wait operations independently of the address space or read/write access.

In addition, the apparatus described in the above-cited JP-A No. Hei 3-99354 performs wait operations when, upon receipt of a ready signal from a memory or an I/O device, the active position of the ready signal to be transmitted to the CPU is changed in a programmable manner. In this case, the fact that signals are received from the memory and I/O devices demands inevitable dependence for control on the address space, thus there is a problem.

The present invention is achieved to overcome the above-described drawbacks and disadvantages and to obtain a data processor which eliminates the need for troublesome circuit modifications when a wait operation becomes necessary for each read or write access because the address space of the CPU is altered or because a memory or any of configured I/O devices is changed, the data processor allowing a suitable program to set or cancel wait operations as desired and free of constraints dictated conventionally by the address space or read/write access.

DISCLOSURE OF INVENTION

In the present invention, there is provided a data processor comprising: a CPU for performing a wait operation when a wait signal is input to a wait terminal of the CPU; a wait/wait cancel instruction setting register to which the CPU sets a wait instruction and a wait cancel instruction; and a wait controller for outputting the wait signal to the wait terminal of the CPU in accordance with the setting of the wait/wait cancel instruction setting register and independently of an address space of the CPU. Owing to this, the wait set/wait cancel can be freely performed by the program notwithstanding the address spaces, and even if there is a change of the address space, the memory or the I/O devices, the data processor can be actualized in which the operation can be carried out by only the modification of the program.

Further, in the present invention, the data processor may comprise: a CPU for extending a bus cycle while a ready signal is being input to a ready terminal of the CPU; a wait/wait cancel instruction setting register which has a bus cycle extension count designating function and to which the CPU sets a wait instruction, await cancel instruction and a bus cycle extension count N; and a wait controller for outputting the ready signal having an N-cycle width to the ready terminal of the CPU in accordance with the setting of the wait/wait cancel instruction setting register having the bus cycle extension count designating function and independently of an address space of the CPU. Owing to this, since the N-times bus cycle extensions can be performed freely by the program notwithstanding the address spaces, and since the number of bus cycle extensions N becomes programmable, the data processor can be actualized in which the operation can be carried out by only the modification of the program for diverse memory and I/O device arrangements.

Moreover, in the present invention, the data processor may comprise: a CPU for extending a bus cycle while a ready signal is being input to a ready terminal of the CPU; a bus cycle extension count setting register to which the CPU sets a bus cycle extension count N; a wait/wait cancel instruction setting register; and a wait controller for outputting a ready signal of an N-cycle width to the ready terminal of the CPU in accordance with the settings of the both registers. Owing to this, since the N-times bus cycle extensions can be performed freely by the program notwithstanding the address spaces, and since the number of bus cycle extensions N becomes programmable, the data processor can be actualized in which the operation can be carried out by only the modification of the program for diverse memory and I/O device arrangements.

Further, in the present invention, there is provided a data processor comprising: a CPU for performing a wait operation when a wait signal is input to await terminal of the CPU; await setting register which has a wait operation enable cycle count designating function and to which the CPU sets a wait instruction and a wait operation enable cycle count M; and a wait controller for outputting a wait signal having an M-cycle width to the wait terminal of the CPU in accordance with the setting of the wait setting register with the wait operation enable count designating function and independently of an address space of the CPU. Owing to this, the wait set and an automatic wait cancel can be performed freely by the program notwithstanding the address spaces, and since the number M of the wait operations becomes programmable, the data processor can be actualized in which the wait set/cancel can be performed by only setting a count value without the wait cancel instruction.

Furthermore, in the present invention, the data processor may comprise: a CPU for extending a bus cycle while a ready signal is being input to a ready terminal of the CPU; a bus cycle extension count setting register; a wait setting register having a wait operation enable cycle count designating function; and a wait controller for outputting a ready signal to the ready terminal of the CPU in accordance with the settings of the two registers and independently of an address space of the CPU. Owing to this, since the N-times bus cycle extensions can be performed freely by the program notwithstanding the address spaces, and since the number M of the wait operations becomes programmable, the data processor can be actualized in which the wait set/cancel can be performed by only setting a count value without the wait cancel instruction.

BEST MODE FOR CARRYING OUT THE INVENTION

To explain this invention in detail, the best mode for carrying out the invention will be described with reference to the accompanying drawings hereinbelow.

FIRST EMBODIMENT

Figure 1:
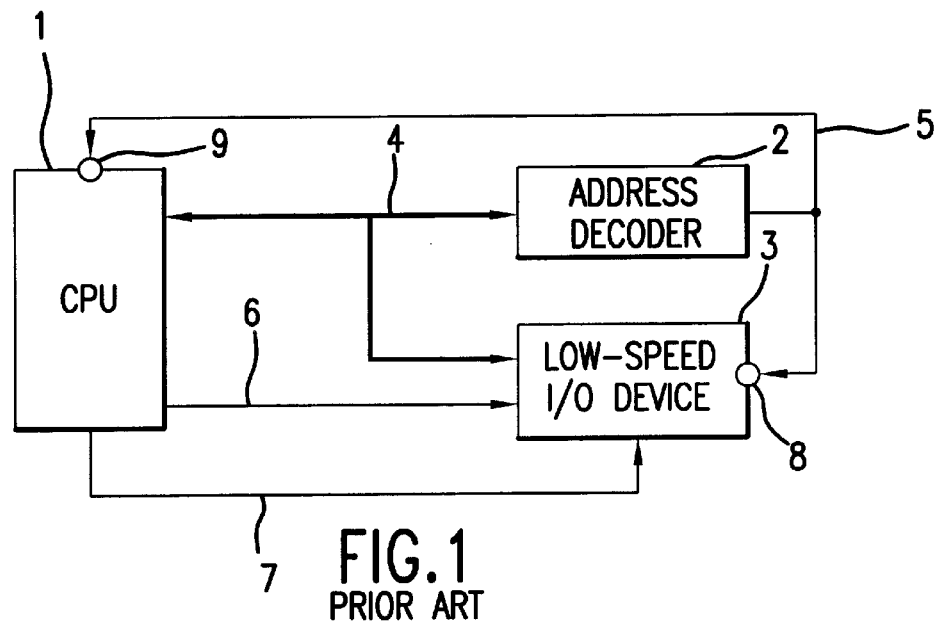
FIG. 1 is a schematic diagram of a conventional data processor.
Figure 2:
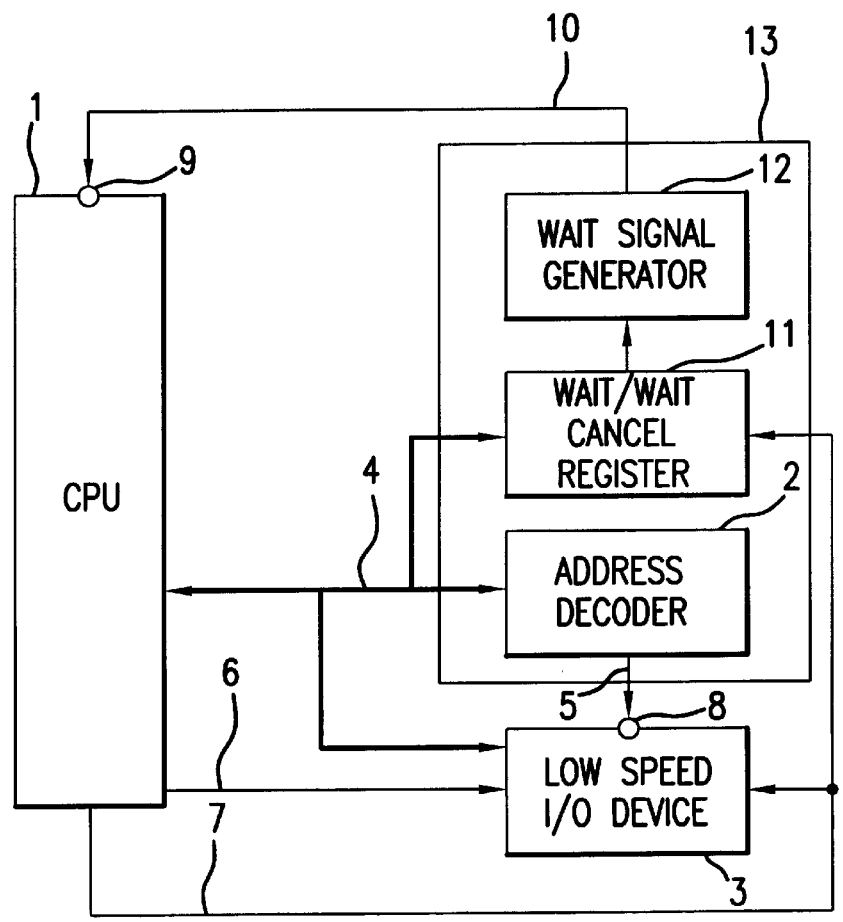
FIG. 2 is a schematic diagram of a data processor practiced as a first embodiment of this invention.
Figure 3:
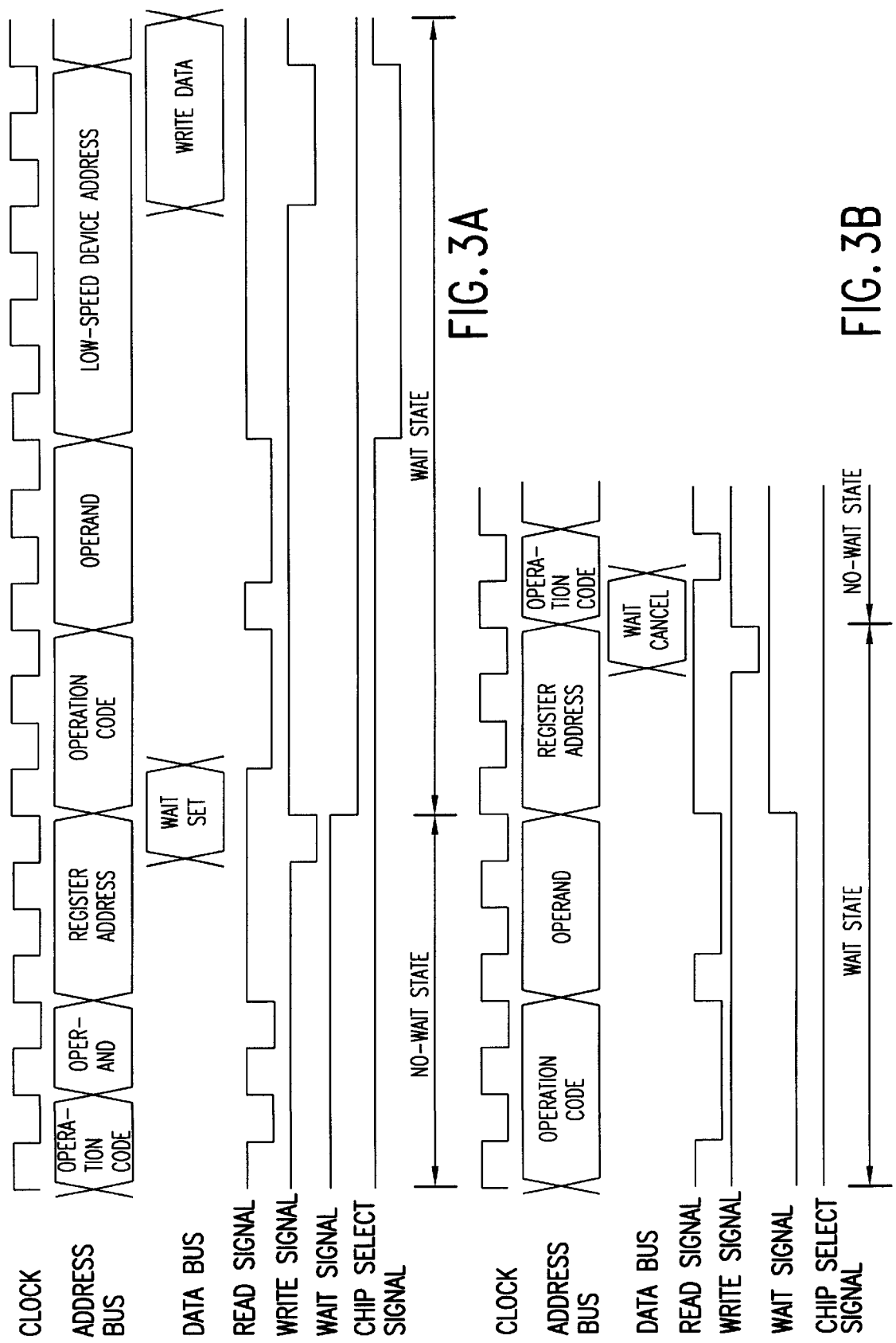
FIG. 3 shows timing charts showing operational timings of the first embodiment.

FIG. 2 shows one example of a constitution of a data processor practiced as the first embodiment of this invention, and FIG. 3 depicts operational timings thereof. In FIG. 2, reference numeral 1 stands for a CPU providing overall control of the data processor; 2 for an address decoder for decoding addresses output by the CPU 1; 3 for a low-speed device which is an accessible device assigned a predetermined address; 4 for an address/data bus linking the CPU 1, the address decoder 2 and the low-speed device 3; 5 for a chip select signal output by the address decoder 2; 6 for a read signal output by the CPU 1; 7 for a write signal output by the CPU 1; 8 for a chip select terminal of the low-speed device 3 for receiving the chip select signal 5 from the address decoder 2; and 9 for a wait terminal of the CPU 1. These parts correspond to their conventional counterparts having the same reference numerals in FIG. 1.

In addition, reference numeral 10 stands for a wait signal input to the wait terminal 9 of the CPU 1; and 11 for a wait/wait cancel instruction setting register to which the CPU sets a wait instruction and a wait cancel instruction. Reference numeral 12 for a wait signal generator acting as a wait controller generating a wait signal 10 to the CPU 1 in accordance with the setting of the wait/wait cancel instruction setting register 11 and independently of an address space of the CPU; and 13 for a CPU peripheral circuit made up of the wait/wait cancel instruction setting register 11, wait signal generator 12 and address decoder 2.

Next the operations will be described.

Here, the workings of the embodiment will be shown in the following order as an example: there is initially a no-wait state, followed by a wait instruction being set to the wait/wait cancel instruction setting register 11, then, with data written to the low-speed device 3, the established wait state is canceled. The CPU 1 first fetches from a ROM the next instruction to be executed in accordance with a built-in program counter. The CPU 1 then writes a wait instruction to the wait/wait cancel instruction setting register 11 memory-mapped to an I/O (input/output device) area of the CPU 1, after the CPU 1 fetches the instruction executed by the inner-program counter from the ROM. Namely, up to this point, the CPU 1 is operating in the no-wait state as depicted in the first half of FIG. 3(a), and a read signal 6 generated per clock pulse causes an operand and an operation code to be read in, as well as a write signal 7 generated two clock pulses later causes the wait instruction placed on the address/data bus 4 to be written to the wait/wait cancel instruction setting register 11 that has been addressed.

Thus, with the wait instruction written to the wait/wait cancel instruction setting register 11, a wait signal 10 generated by the wait signal generator 12 is input to the wait terminal 9 of the CPU 1 starting from the next program state, i.e., at the next operation code fetch, thereby causing a wait operation to take place, so that, from this point on, the first embodiment operates in a wait state as shown in the latter half of FIG. 3(a).

Where the CPU 1 is to access the low-speed device 3 for a write operation thereto in the wait state, the CPU 1 first fetches the next instruction to be executed from the ROM as described above. Because the wait/wait cancel instruction setting register 11 is set with the wait instruction at this point, the operation code fetch cycle is also subject to a wait operation (in the example of FIG. 3(a), a read signal 6 for reading the operand and operation code is generated at intervals of two clock pulses).

The CPU 1 then outputs onto the address/data bus 4 a target intra-device address to which to write data. This address is input to the address decoder 2 from the address/data bus 4. Upon receipt of the address, the address decoder 2 outputs a chip select signal 5 in accordance with the address. The chip select signal 5 from the address decoder 2 is input to the chip select terminal 8 of the appropriate low-speed device 3 that has been selected by the CPU 1.

After placing the address onto the address/data bus 4, the CPU 1 outputs a write signal 7 and places onto the address/data bus 4 target data to be written. At this point, the wait state is in effect because the wait/wait cancel instruction setting register 11 is set with the wait instruction. Thus the CPU 1 performs a wait operation based on the wait signal 10 output by the wait signal generator 12. In the example of FIG. 3(a), the write data placed on the address/data bus 4 are written to the low-speed device 3 in accordance with a write signal 7 generated four clock pulses after the read signal 6 for reading the operand and operation code.

When canceling the wait state established in the above-described manner, the CPU 1 first fetches from the ROM the instruction to be executed next in accordance with the built-in program counter as shown in FIG. 3(b). The CPU 1 then writes a wait cancel instruction to the wait/wait cancel instruction setting register memory-mapped to the I/O area of the CPU. With the wait cancel instruction written to the wait/wait cancel instruction setting register 11, a wait signal 10 (a signal to cancel the wait state in this case) generated by the wait signal generator 12 is input to the wait terminal 9 of the CPU 1 starting from the next program state, i.e., at the next operation code fetch, whereby this disables the wait operation. From this point on, the first embodiment operates without the wait operation.

Although the process in the example above was shown involving a write access to the low-speed device 3, the same holds for cases of a read access to the device 3.

As described above, according to the first embodiment, it allows a suitable program to set or cancel a wait state freely and independently of address space constraints, and there is an effect that even if there is any change in diverse memory and I/O device arrangements, it can be dealt with by only modifying the program.

SECOND EMBODIMENT

The first embodiment was shown using a register setting only a wait instruction and a wait cancel instruction as the wait/wait cancel instruction setting register, and a case was explained that a wait/wait cancel is simply performed to all accessible devices. Alternatively, the second embodiment may have the wait/wait cancel instruction setting register provided with a function for setting a bus cycle extension count N, thereby allowing a wait access of the predetermined N-times bus cycle extensions as designated with respect to all the configured accessible devices.

Figure 4:
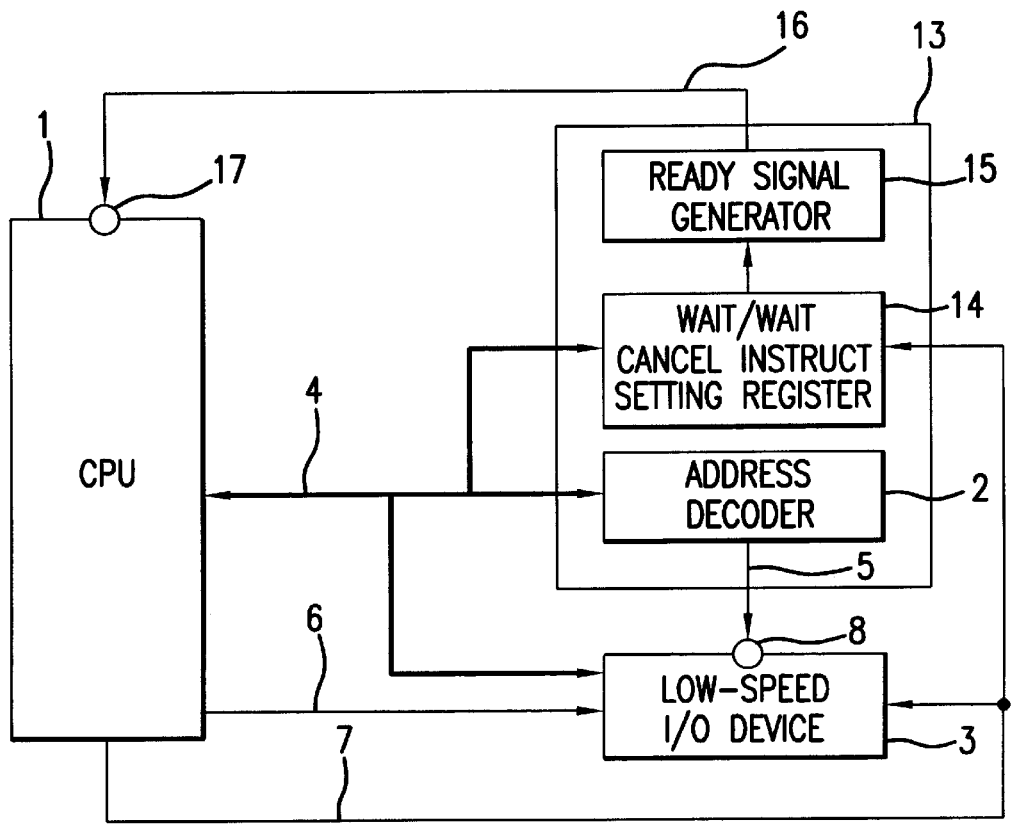
FIG. 4 is a schematic diagram of a data processor practiced as a second embodiment of the invention.

FIG. 4 shows an example of constitution of a preferred data processor as such embodiment of this invention. In FIG. 4, reference numeral 14 denotes a wait/wait cancel instruction setting register having a bus cycle extension count designating function. In addition to its original capability, the register 14 may have a bus cycle extension count N set thereto. Reference numeral 15 represents a ready signal generator acting as a wait controller that generates a ready signal to the CPU 1 in accordance with the setting of the wait/wait cancel instruction setting register 14 having the bus cycle extension count designating function, and 16 shows the ready signal. Reference numeral 17 stands for a ready terminal of the CPU 1 for receiving the ready signal 16, and the CPU 1 extends bus cycles as long as the ready signal 16 is being input to the ready terminal 17. The other parts of the second embodiment with their counterparts already shown in FIG. 2 are designated by like reference numerals, and their descriptions are omitted.

Next the operations will be described.

The CPU 1 writes a wait instruction together with a bus cycle extension count N to the wait/wait cancel instruction setting register 14 having the bus cycle extension count designating function. When the bus cycle extension count N and the wait instruction are written to the register 14 as above, the ready signal generator 15 generates and outputs a ready signal 16 having an N-cycle width on the basis of the setting of the wait/wait cancel instruction setting register 14 starting from the next program state. The ready signal 16 is sent from the ready signal generator 15 to the ready terminal 17 of the CPU 1. During the N-times bus cycle that the ready signal 16 is being input to the ready terminal 17, the wait access due to the extension of bus cycle is performed.

In addition, when canceling such a wait state above, as with the first embodiment, there is performed by CPU 1 writing await cancel instruction to the wait/wait cancel instruction setting register 14 equipped with the bus cycle extension count designating function.

As described above, according to the second embodiment, it allows a suitable program to set freely as many as N-times bus cycle extensions and to cancel the wait state independently of address space constraints. Because the number of bus cycle extensions N is programmable, there is an effect that changes in diverse memory and I/O device arrangements can be dealt with by simply making necessary program modifications.

THIRD EMBODIMENT

In the second embodiment, although a case was explained that the wait/wait cancel instruction setting register was shown comprising the bus cycle extension count designating function, and the number of bus cycle extensions N designated by the CPU was held in the register, the third embodiment may include a separately furnished bus cycle extension count setting register for retaining the bus cycle extension count N specified by the CPU.

Figure 5:
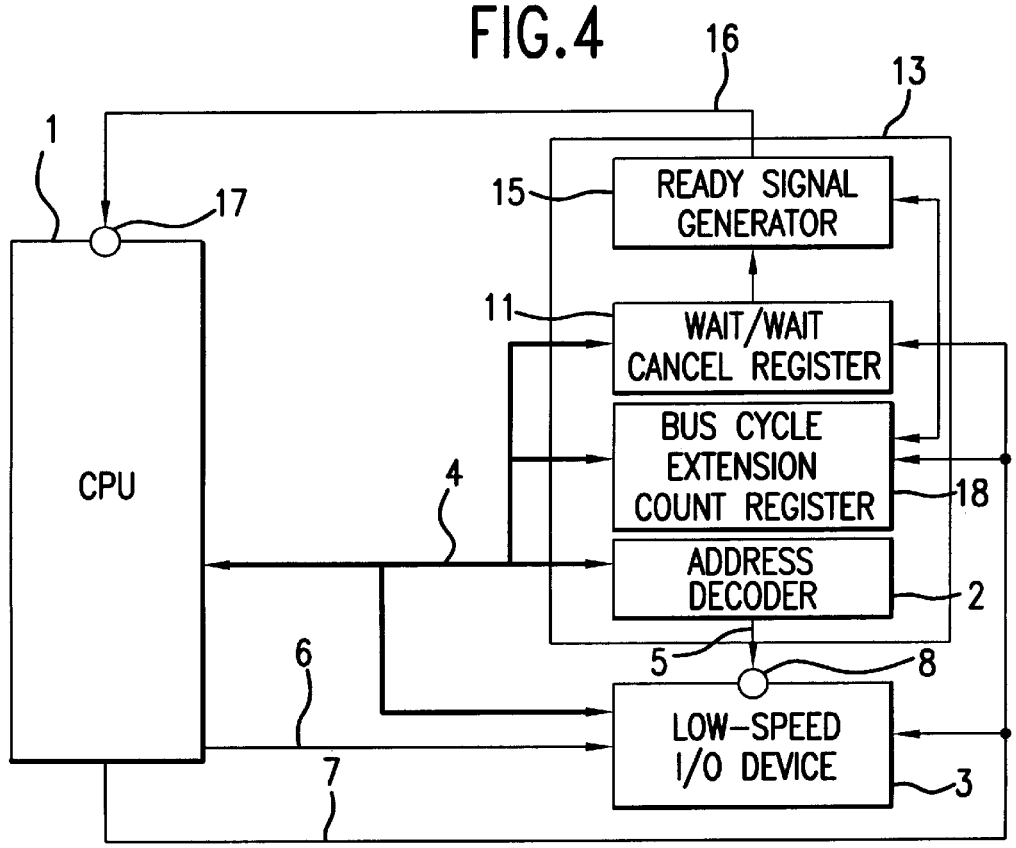
FIG. 5 is a schematic diagram of a data processor practiced as a third embodiment of the invention.

FIG. 5 illustrates an example of constitution of a data processor practiced as the third embodiment of this invention, and in the figure, reference numeral 18 denotes a bus cycle extension count setting register that accommodates the bus cycle extension count N designated by the CPU 1. The third embodiment differs from the second embodiment in that the wait/wait cancel instruction setting register 14 of the second embodiment having the bus cycle extension count designating function is replaced by two separate registers: the bus cycle extension count setting register 18, and the wait/wait cancel instruction setting register 11 also used by the first embodiment and not comprising the bus cycle extension count designating function.

The operations will be described next.

The CPU 1 first writes a bus cycle extension count N to the bus cycle extension count setting register 18, and as with the first embodiment, the CPU 1 then writes a wait instruction to the wait/wait cancel instruction setting register 11. Thus, after the bus cycle extension count N and the wait instruction are written to the bus cycle extension count setting register 18 and wait/wait cancel instruction setting register 11 respectively, the ready signal generator 15 generates and outputs a ready signal 16 of an N-cycle width starting from the next program state in accordance with the settings of the two registers. As with the second embodiment, the ready signal 16 is sent from the ready signal generator 15 to the CPU 1. While the ready signal 16 is being input to the ready terminal 17 of the CPU 1, the CPU 1 waits during the N-times bus cycles before access.

As described above, according to the third embodiment, it allows a suitable program to provide N-time bus cycle extensions and to cancel the wait state as desired and independently of address space constraints. Because the number of bus cycle extensions N is programmable, there is an effect that changes in diverse memory and I/O device arrangements can be dealt with by simply making necessary program modifications.

FOURTH EMBODIMENT

Although the second and the third embodiments were shown having the bus cycle extension count N established so as to enter a wait state of the N-times bus cycle extensions with respect to all the configured accessible devices, it may have the wait setting register, to which to set a wait instruction, equipped with a wait operation enable cycle count M designating function. Furnished with the new function, the fourth embodiment may wait during the designated M cycles before accessing any one of the configured accessible devices.

Figure 6:
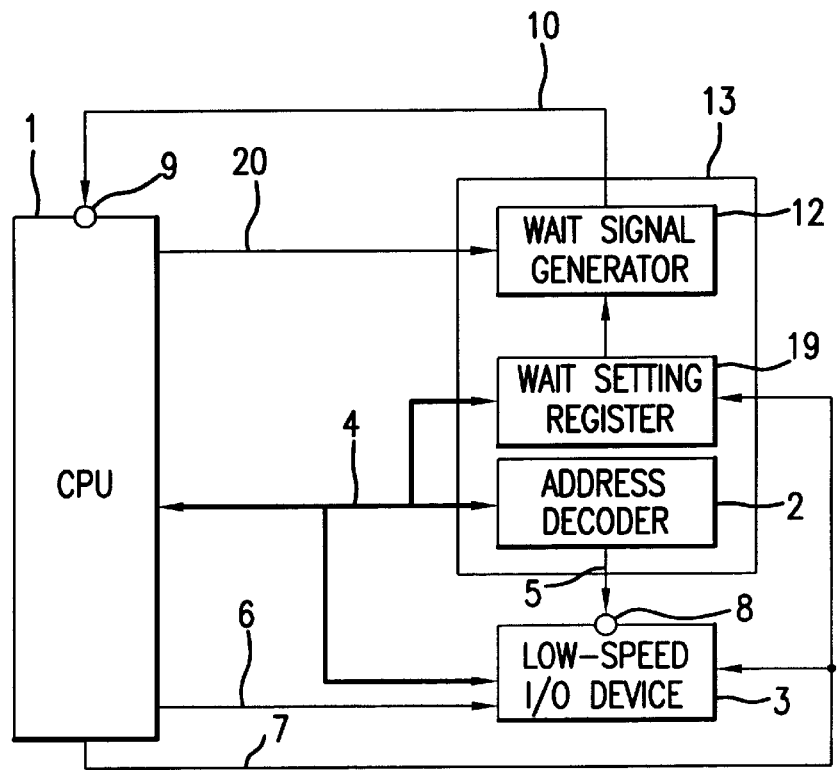
FIG. 6 is a schematic diagram of a data processor practiced as a fourth embodiment of the invention.

FIG. 6 shows an example of constitution of a data processor practiced as the fourth embodiment of the invention, and those parts that also appeared in the first embodiment of FIG. 2 are designated by like reference characters and their descriptions are omitted where redundant. In the figure, reference numeral 19 denotes a wait setting register comprising a wait operation enable cycle count function, and the register 19 allows not only a wait instruction but also a wait operation enable cycle count M (number of times the wait operation is performed) to be set thereto. A wait cancel instruction will not be set to this wait setting register 19. Reference numeral 20 represents a cycle clock signal for cycle counting purposes output by the CPU 1 for transfer to the wait signal generator 12 serving as a wait controller under control of the wait setting register 19 having the wait operation enable cycle count designating function.

Next the operations will be described.

As with the first embodiment, the CPU 1 of the fourth embodiment writes a wait operation enable cycle count M as well as a wait instruction to the wait setting register 19 with the wait operation enable cycle count designating function. Then, after the wait operation enable cycle count M and the wait instruction are written to the register 19, the wait signal generator 12 generates and outputs a wait signal 10 having an M-cycle width starting from the next program state by counting the cycle clock signal 20 from the CPU 1 on the basis of the count value M set in the wait setting register 19.

The wait signal 10 of the M-cycle width is sent from the wait signal generator 12 to the CPU 1, then, with the wait signal 10 input to its wait terminal 9, the CPU 1 waits during the M cycles before access. In addition, after the M cycles have elapsed, the wait state is automatically canceled, and thereafter, normal access operations may continue.

As described above, according to the fourth embodiment, it allows a suitable program to set or cancel wait state as desired and independently of address space constraints. Because the wait operation enable cycle count M is programmable, there is an effect that, if a count value is established, the wait operation is performed as many times as designated and then canceled without the additional use of a wait cancel instruction.

FIFTH EMBODIMENT

Although there is explained that the fourth embodiment was shown comprising await setting register capable of accommodating a wait instruction and further a designated function having a wait operation enable cycle count M therein, to wait during the designated M cycles before access, it may have a bus cycle extension count setting register set with a bus cycle extension count N to permit as many as N-times bus cycle extensions.

Figure 7:
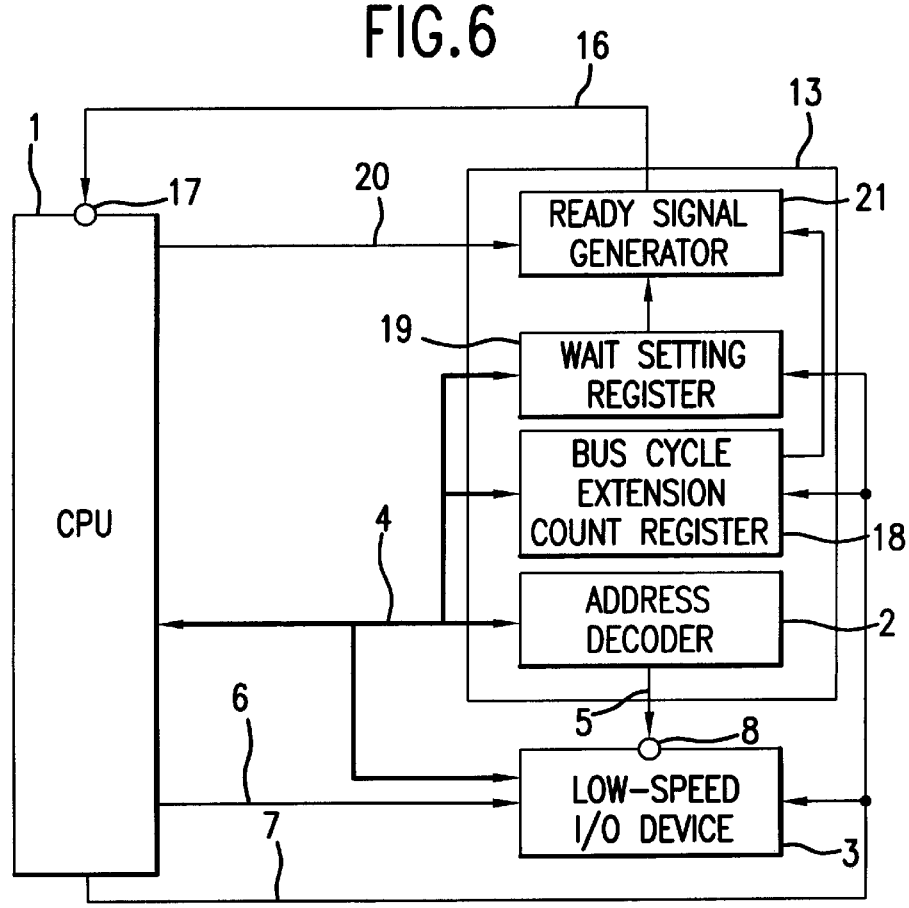
FIG. 7 is a schematic diagram of a data processor practiced as a fifth embodiment of the invention.

FIG. 7 depicts an example of constitution of a data processor practiced as the fifth embodiment of the invention, and those parts that also appeared in the fourth embodiment of FIG. 6 are designated by like reference characters and their descriptions are omitted where redundant. In the figure, reference numeral 18 denotes a bus cycle extension count setting register for retaining the bus cycle extension count N designated by the CPU 1, and is identical to its counterpart of the third embodiment in FIG. 5, indicated by the same reference numeral. Reference numeral 21 represents a ready signal generator serving as a wait controller for generating a ready signal to the CPU 1 in accordance with the settings of both the bus cycle extension count setting register 18 and the wait setting register 19 having the wait operation enable cycle count designating function. Reference numeral 16 shows its ready signal and 17 stands for a ready terminal of the CPU 1.

The operations will be described next.

The CPU 1 first writes a bus cycle extension count N to the bus cycle extension count setting register 18, then, as with the fourth embodiment, the CPU 1 of the fifth embodiment then writes a wait operation enable cycle count M as well as await instruction to the wait setting register 19 with the wait operation enable cycle count designating function. After the bus cycle extension count N and wait operation enable cycle count M are written to the registers 18 and 19 respectively as such, the ready signal generator 21 generates and outputs a ready signal 16 starting from the next program state in accordance with the settings N and M of the two registers 18 and 19.

The ready signal 16 has an N-cycle width based on the bus cycle extension count N set in the bus cycle extension count setting register 18, and is sent from the ready signal generator 21 to the CPU 1. With the ready signal 16 input to its ready terminal 17, the CPU 1 waits during the N-times bus cycle extensions before access. The CPU 1 also waits during the M cycles based on the wait operation enable cycle count M set in the wait setting register 19 before access. After the wait operation of the M cycles, the wait state is automatically canceled, and thereafter, normal access operations may continue.

As described above, according to the fifth embodiment, it allows a suitable program to provide N-times bus cycle extensions as desired and independently of address space constraints. Because the wait operation enable cycle count M is also programmable, there is an effect that if a count value is established, the wait operation is performed as many times as designated and then canceled without the additional use of a wait cancel instruction.

INDUSTRIAL APPLICABILITY

As mentioned above, the data processor according to the present invention uses input/output devices having difference in access speed between read and write operations, so that it is useful to deal with two mutually exclusive choices: adjust to the low-speed for write access and have an extra processing time spent wastefully by the CPU on the one hand, or adjust to the high-speed for read access and find it impossible to carry out data write operations at that speed on the other hand, and particularly, suitable for use in microcomputer-applied systems having their programs written to an expensive flash memory at their prototype trial stage and later to an inexpensive one-time ROM at the commercial stage.

What is claimed is:

1. A data processor, comprising:
   a CPU capable of performing wait operations by setting wait instructions and wait cancel instructions based on program instructions retrieved by the CPU;
   a plurality of accessible devices such as a memory and input/output devices which are accessible by said CPU;
   a wait/wait cancel instruction setting register to which said CPU sets a wait instruction and a wait cancel instruction as programmed by said retrieved program instructions, which place said CPU into sequential program states; and
   a wait controller for outputting to said CPU a wait signal for a wait operation for permitting wait-based access to all of said accessible devices starting from the next program state after a wait instruction is set in said wait/wait cancel instruction setting register by the CPU, said wait controller further outputting to said CPU a wait signal for canceling the wait operation on all of said accessible devices starting from the next program state after a wait cancel instruction is set in said wait/wait cancel instruction setting register by the CPU.

2. A data processor according to claim 1, wherein said wait/wait cancel instruction setting register is furnished additionally with a bus cycle extension count designating function for retaining a bus cycle extension count N designated by said CPU; and
   wherein said wait controller outputs to said CPU a ready signal for permitting wait-based access to all of said accessible devices during N-times bus cycle extensions starting from said next program state on the basis of said wait instruction and of said bus cycle extension count N set in said wait/wait cancel instruction setting register.

3. A data processor according to claim 1, further comprising a bus cycle extension count setting register for retaining a bus cycle extension count N designated by said CPU;
   wherein said wait controller outputs to said CPU a ready signal for permitting wait-based access to all of said accessible devices during N-times bus cycle extensions starting from said next program state on the basis of said bus cycle extension count N set in said bus cycle extension count setting register and of said wait instruction set in said wait/wait cancel instruction setting register.

4. A data processor, comprising:
   a CPU capable of performing wait operations by setting wait instructions and wait cancel instructions based on program instructions retrieved by the CPU;
   a plurality of accessible devices such as a memory and input/output devices which are accessible by said CPU;
   a wait setting register having a wait operation enable cycle count designating function to which said CPU sets a wait instruction and a wait operation enable cycle count M as programmed by said retrieved program instructions, which place said CPU into sequential program states; and
   a wait controller for permitting wait-based access to all of said accessible devices starting from the next program state during the M cycles designated by said wait operation enable cycle count M after a wait instruction is set in said wait instruction register by the CPU, said wait controller thereafter outputting to said CPU a wait signal for automatically canceling the wait operation on all of said accessible devices.

5. A data processor according to claim 4, further comprising a bus cycle extension count setting register for retaining a bus cycle extension count N designated by said CPU;
   wherein said wait controller permits wait-based access to all of said accessible devices during N-times bus cycle extensions starting from said next program state on the basis of said bus cycle extension count N set in said bus cycle extension count setting register and of said wait instruction and said wait operation enable cycle count M set in said wait setting register having said wait operation enable cycle count designating function, said wait controller further permitting wait-based access during the M cycles, said wait controller thereafter outputting to said CPU a wait signal for automatically canceling the wait operation on all of said accessible devices.

* * * * *